US006371362B1

(12) United States Patent
Mehta et al.

(10) Patent No.: US 6,371,362 B1
(45) Date of Patent: Apr. 16, 2002

(54) ROBOTIC WELDING OF BRACKETS INSIDE METAL ENCLOSURES

(75) Inventors: Tarak Mehta, Cary; Jukka M. Torvinen, Raleigh, both of NC (US)

(73) Assignee: ABB T&D Technology Ltd., Zurich (CH)

( * ) Notice: Subject to any disclaimer, the term of this patent is extended or adjusted under 35 U.S.C. 154(b) by 0 days.

(21) Appl. No.: 09/471,730

(22) Filed: Dec. 23, 1999

(51) Int. Cl.$^7$ .......................... B23K 5/22; B23K 37/00; B23K 1/14; B23K 1/00; B07B 13/00
(52) U.S. Cl. ...................... 228/212; 228/4.1; 228/49.1; 228/102; 29/403.1
(58) Field of Search ................................ 228/212, 102, 228/126, 137, 49.1, 4.1, 127, 131; 29/430.1

(56) References Cited

U.S. PATENT DOCUMENTS

| | | | |
|---|---|---|---|
| 3,881,605 A | * 5/1975 | Grossman ................ 214/1 CM |
| 4,506,788 A | * 3/1985 | Dallas ........................ 206/455 |
| 4,606,488 A | * 8/1986 | Yanagisawa ................. 228/45 |
| 4,624,405 A | * 11/1986 | Newell ....................... 228/212 |
| 4,684,778 A | * 8/1987 | Cecil ........................... 219/89 |
| 4,844,326 A | * 7/1989 | Kashihara et al. .......... 228/182 |
| 5,077,458 A | * 12/1991 | Takano et al. .............. 219/116 |
| 5,098,005 A | 3/1992 | Jack ........................... 228/4.1 |
| 5,111,988 A | 5/1992 | Strickland ................... 228/102 |
| 5,120,929 A | 6/1992 | Kobayashi et al. ......... 219/110 |
| 5,160,079 A | 11/1992 | Cole ........................... 228/212 |
| 5,265,317 A | 11/1993 | Angel .......................... 29/429 |
| 5,267,683 A | * 12/1993 | Hamada et al. .............. 228/4.1 |
| 5,347,700 A | 9/1994 | Tominaga et al. ............ 29/430 |
| 5,409,158 A | 4/1995 | Angel .......................... 228/182 |
| 5,491,320 A | 2/1996 | Taylor ................... 219/137.41 |
| 5,811,055 A | 9/1998 | Geiger ......................... 266/49 |
| 5,988,486 A | 11/1999 | Kobayashi et al. ......... 228/212 |
| 5,990,442 A | 11/1999 | Suita et al. .............. 219/86.25 |
| 6,036,076 A | 1/2000 | Royle ........................... 228/102 |
| 6,036,082 A | 3/2000 | Caldarone ................... 228/212 |

FOREIGN PATENT DOCUMENTS

| | | |
|---|---|---|
| EP | 0 438 988 A | 7/1991 |
| JP | 10272570 | 10/1998 |

* cited by examiner

*Primary Examiner*—Tom Dunn
*Assistant Examiner*—Zidia Pittman
(74) *Attorney, Agent, or Firm*—Woodcock Washburn LLP

(57) ABSTRACT

The present invention provides a system and method for attaching a device to an inside wall of an enclosure. The device is removably attached to a positioner. Where the device includes a metal substance, it may be attached to the positioner by a magnet affixed to the positioner, for example. A first motor-operated moving device moves the enclosure such that the device abuts an inside wall of the enclosure. A second motor-operated moving device, for example a robot, then attaches the device to the inside wall of the enclosure. Where the enclosure and the device are composed of metal, the two may be welded together. In this instance, the first motor-operated moving device may be a non-robotic, motor-operated moving device that provides a ground path for the weld.

15 Claims, 3 Drawing Sheets

ROBOTIC WELDING OF BRACKETS INSIDE METAL ENCLOSURES

FIELD OF THE INVENTION

The present invention relates to field of automated manufacture and assembly. More specifically, the present invention relates to the robotic welding within small metal enclosures.

BACKGROUND

Distribution transformers commonly employ mounting brackets to keep the transformer's core stationary within the transformer's enclosure. Usually, two or more brackets are welded to the inside of the transformer's enclosure, adjacent to each side of the core. The core then may be bolted to the mounting brackets by a brace or similar connection device. An anchored transformer core prevents inductive shorting between the transformer and its enclosure during normal operation by maintaining the minimum spacing requirements established during manufacture. This stability is especially important while the transformer is transported from the manufacturing line to the field.

To date, mounting brackets inside transformer enclosures have been welded by human welders because grounding concerns and space constraints have prevented using robotics.

Specifically, the limited area inside the transformer enclosure (typically, the enclosure takes the form of a rectangular box with dimensions of about 24 inches in height, 32 inches in depth, and 12 inches deep) precludes the enclosure from accepting the two robotic arms needed to weld the bracket to the inside of the enclosure: one arm to hold and locate the bracket and the other arm to weld the bracket. In addition, the confined space prevents the robot from being sufficiently accurate in locating the bracket within the enclosure. Another problem associated with using robotics to weld brackets inside a transformer enclosure involves providing the necessary ground path for the high welding currents. Currently, human intervention is necessary to clamp a ground onto the device being welded. However, because of the potential danger created by human and robotic interaction, it is necessary to automate the entire bracket mounting process, including affixing the ground connection. Therefore, an automated ground connection is required. Significantly, the automated ground connection can not be provided by a robot because of the dangerous welding currents that may travel through the robot's electronically sensitive arm.

Aside from safety concerns, another reason it would be beneficial to automate the process of constructing a transformer enclosure is that such automation would make the process more efficient and thus less expensive for the customer and thus more profitable for the manufacturer. Automation would also permit the end product to be built to the customer's specifications in a more efficient and cost effective way. For example, the customer could specify the desired product using the Internet as a means for filling out specialized forms in which the dimensions and other aspects of the product are defined. Such specifications could then be used as inputs to an automated process for building the end product to the customer's specifications.

Because of the distinct benefit offered by automation, it would be advantageous to provide a method for allowing robots to weld mounting brackets inside transformer enclosures and for providing an automated, non-robotic ground connection for the method.

SUMMARY OF THE INVENTION

The present invention provides a system and method for attaching a device to an inside wall of an enclosure. The device is removably attached to a positioner. Where the device includes a metal substance, it may be attached to the positioner by a magnet affixed to the positioner, for example. A first motor-operated moving device moves the enclosure such that the device abuts an inside wall of the enclosure. A second motor-operated moving device, for example a robot, then attaches the device to the inside wall of the enclosure. Where the enclosure and the device are composed of metal, the two may be welded together. In this instance, the first motor-operated moving device may be a non-robotic, motor-operated moving device that provides a ground path for the weld.

DETAILED DESCRIPTION OF A PREFERRED EMBODIMENT

Figure 1:
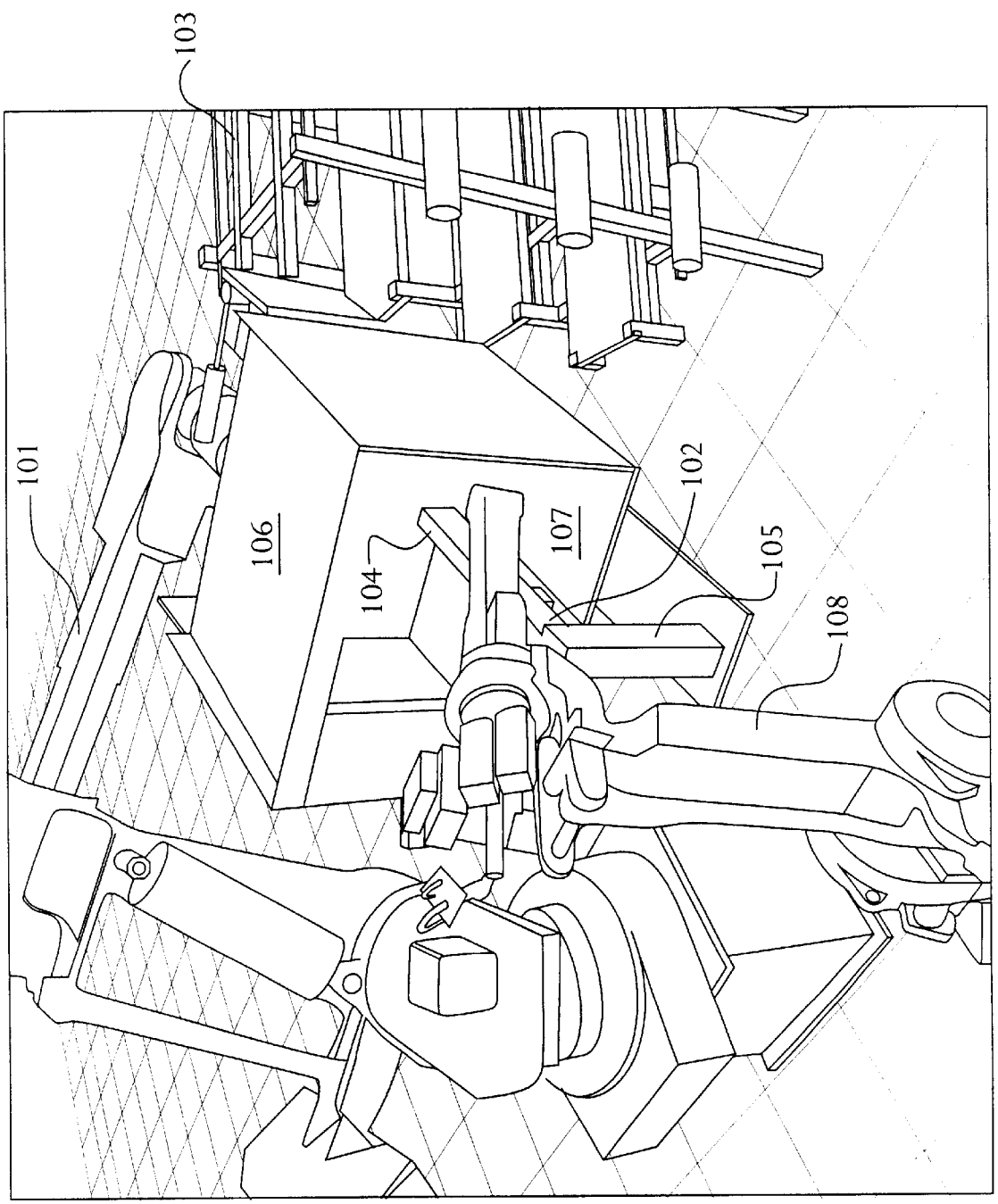
FIG. 1 is a drawing of a system for attaching a device to an inside wall of an enclosure, according to the present invention.
Figure 2:
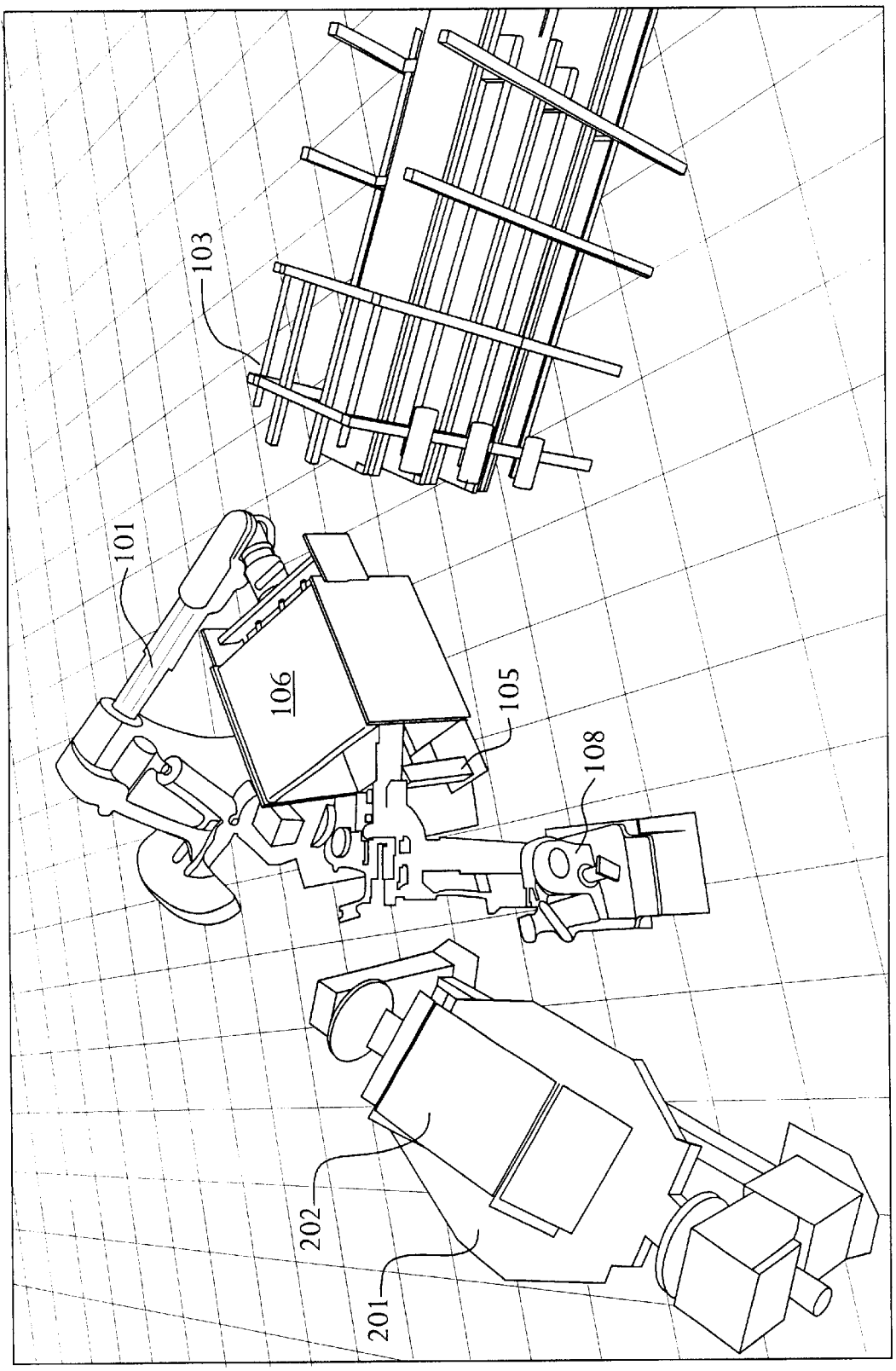
FIG. 2 is wide-view drawing of the system for attaching a device to an inside wall of an enclosure, according to the present invention.
Figure 3B:
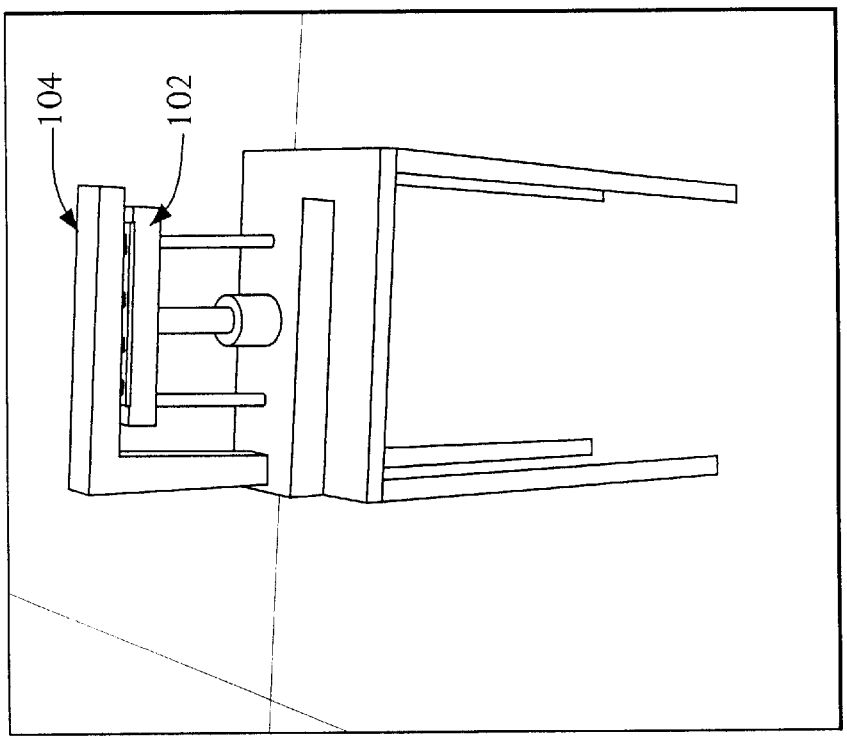
FIGS. 3A and 3B show a motor-operated moving device for positioning the device to be attached to the inside wall of the enclosure, according to the present invention.
Figure 3A:
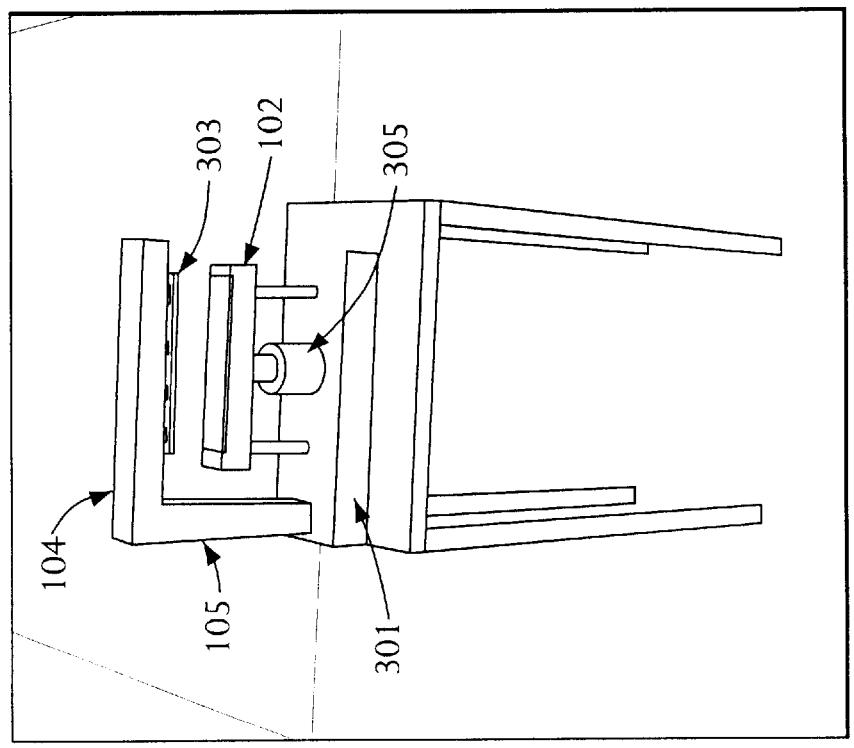

As shown in FIGS. 1, 2, 3A and 3B, the present invention overcomes the above limitations found in the prior art. FIGS. 1 and 2 are drawings of a system for attaching a device to an inside wall of an enclosure, according to the present invention. FIG. 2 is wide-view drawing of the system. FIGS. 3A and 3B show a motor-operated moving device for positioning the device to be attached to the inside wall of the enclosure, according to the present invention.

As shown in FIGS. 1, 2, 3A and 3B, a first robot 101 retrieves a mounting bracket 102 from a rack 103. First robot 101 moves mounting bracket 102 to a pneumatic lifting device 305. Pneumatic, lifting device 305 raises mounting bracket 102 to a longitudinal arm 104 on a bracket holding device 105 (as shown in FIG. 3B). Both bracket holding device 105 and longitudinal arm 104 are stationary. Bracket holding device 105 has a magnet 303 on the underside of longitudinal arm 104 that holds mounting bracket 102. First robot 101 then retrieves another mounting bracket (not shown) from rack 103 and Again places it on pneumatic lifting device 305 for future grounding and welding. First robot 101 then retrieves transformer enclosure 106 from automated table, 201, as shown in FIG. 2. FIG. 2 also shows automated table 201 holding another transformer enclosure 202. Transformer enclosure 202 will undergo the bracket welding process upon completion of transformer enclosure 106.

First robot 101 moves the open end of transformer enclosure 106 such that mounting bracket 102 and longitudinal arm 104 of bracket holding device 105 are positioned on an inside wall 107 of transformer enclosure 106. First robot 101 moves transformer enclosure 106 vertically until mounting bracket 102 engages inside wall 107 of transformer enclosure 106. First robot 101 then moves transformer enclosure 106 horizontally until mounting bracket 102 is properly positioned along inside wall 107 of transformer enclosure 106. Because first robot 101 moves transformer enclosure 106 around stationary mounting bracket 102, instead of moving mounting bracket 102 inside a stationary transformer enclosure, first robot 101 can position mounting bracket 102 with more precision. Once mounting bracket 102 is properly positioned, a second robot 108 welds mounting bracket 102 to inside wall 107 of transformer enclosure 106, while first robot 101 continues to hold transformer enclosure 106 in place relative to mounting bracket 102.

Because of the high current flow associated with the welding process, it is necessary to provide an automated, non-robotic ground path. The ground path is provided by pneumatic lifting device 305. Unlike robots 101 and 108, pneumatic lifting device 305 is not sensitive to the high ground currents inherent in welding, and thus provides the necessary ground path for the welding process. Once first robot 101 properly positions transformer enclosure 106 around mounting bracket 102, pneumatic lifting device 305 lifts the next mounting bracket (already loaded onto pneumatic arm device 105 by first robot 101 for future welding) into contact with transformer enclosure 106. The next mounting bracket forms a conductive path between transformer enclosure 106 and pneumatic lifting device 305. Pneumatic lifting device 305 is connected to a ground potential source (not shown).

Once mounting bracket 102 has been welded by second robot 108, first robot 101 removes transformer enclosure 106 from longitudinal arm 104 and bracket holding device 105. Pneumatic lifting device 305 then raises the next mounting bracket to longitudinal arm 104 of bracket holding device 105. The next mounting bracket is held in place on bracket holding device 105 magnet 303 located on the underside of longitudinal arm 104, just as was mounting bracket 102. The process is repeated using a next welding bracket. If only two mounting brackets are desired in transformer enclosure 106, first robot 101 retrieves another transformer enclosure 202 from automated table 201 (shown in FIG. 2), and the bracket welding process is repeated. If, on the other hand, a third or fourth mounting bracket is desired in transformer enclosure 106, first robot 101 again places transformer enclosure 106 around longitudinal arm 104 of bracket holding device 105 so that additional brackets may be welded.

Those skilled in the art will appreciate that numerous changes and modifications may be made to the preferred embodiment of the invention and that such changes and modifications may be made without departing from the spirit of the invention. For example, it should be understood that mounting bracket 102 may be any device that may be attached within an enclosure. It should also be understood that transformer enclosure 106 may include any type of enclosure used in any application. Finally, it should be understood that the method of attaching the device to the enclosure may be accomplished by any means, including welding. It is therefore intended that the appended claims cover all such equivalent variations as fall within the true spirit and scope of the invention.

We claim:

1. A method for attaching a device to an inside wall of an enclosure, comprising the acts of:

removably attaching said device to a positioner;

moving said enclosure about said device such that said device abuts said inside wall of said enclosure; and attaching said device to said inside wall of said enclosure.

2. The method of claim 1, wherein said act of attaching is performed by a robot.

3. The method of claim 1, wherein said device includes a metal substance, and wherein said enclosure includes a metal substance, and further wherein said act of removably attaching includes using a magnet.

4. The method of claim 3, wherein said robot attaches said device by welding.

5. The method of claim 1, wherein said act of moving is performed by a robot.

6. The method of claim 1, wherein said positioner is a non-robotic, motor-operated moving device that provides a ground path.

7. A system for attaching a device to an inside wall of an enclosure, comprising:

a positioner that holds said device;

a first motor-operated moving device that moves said enclosure such that said device abuts an inside wall of said enclosure; and a second motor-operated moving device that attaches said device to said inside wall of said enclosure.

8. The system of claim 7, wherein said second motor-operated moving device is a robot.

9. The system of claim 8, wherein said device includes a metal substance, and wherein said enclosure includes a metal substance, and further wherein said positioner includes a magnet that removably holds said device.

10. The system of claim 9, wherein said robot welds said device to said inside wall of said enclosure.

11. The system of claim 7, wherein said first motor-operated moving device is a robot.

12. The system of claim 7, wherein said positioner is non-robotic, motor-operated moving device that provides a ground path.

13. A system comprising a first motor-operated moving device that moves an enclosure about a device until said device abuts said inside wall of said enclosure, said system further comprising a robot that attaches said device to said inside wall of said enclosure.

14. The system of claim 13, wherein said device is removably attached to an automated positioner.

15. A system that welds a metal device to an inside wall of a metal enclosure, wherein said device is removably attached to a positioner using a magnet, said positioner providing a ground path, said system further comprising a motor-operated moving device that moves said enclosure such that said device abuts an inside wall of said enclosure, and a robot that attaches said device to said inside wall of said enclosure.

* * * * *